United States Patent [19]
Hara et al.

[11] Patent Number: 4,875,624
[45] Date of Patent: Oct. 24, 1989

[54] AIR CONDITIONER SYSTEM FOR AUTOMOTIVE VEHICLE

[75] Inventors: Junichiro Hara; Yoshiyuki Ogihara; Hideo Takahashi, all of Kanagawa, Japan

[73] Assignee: Nissan Motor Company, Limited, Yokohama, Japan

[21] Appl. No.: 275,988

[22] Filed: Nov. 25, 1988

[30] Foreign Application Priority Data

Nov. 25, 1987 [JP] Japan .................... 62-296420

[51] Int. Cl.⁴ .............................................. F24F 13/10
[52] U.S. Cl. .................................... 236/49.5; 98/2.11; 165/43
[58] Field of Search ........................ 236/49 D; 62/244; 98/2.11; 165/42, 43

[56] References Cited

U.S. PATENT DOCUMENTS

| | | | |
|---|---|---|---|
| 3,682,381 | 8/1972 | Eckman et al. | 236/49 D X |
| 3,684,170 | 8/1972 | Roof | 236/490 X |
| 4,408,712 | 10/1983 | Naganoma et al. | 165/43 X |
| 4,427,056 | 1/1984 | Johnson et al. | 165/42 |
| 4,498,309 | 2/1985 | Kobayashi et al. | 236/49 D |
| 4,671,458 | 6/1987 | Fukuda et al. | 236/49 D |
| 4,738,116 | 4/1988 | Himeno et al. | 236/49 D X |
| 4,757,944 | 7/1988 | Kagohata et al. | 236/49 D X |

*Primary Examiner*—William E. Tapolcai
*Attorney, Agent, or Firm*—Pennie & Edmonds

[57] ABSTRACT

An air conditioner system for automotive vehicles includes an air flow direction setting unit for adjusting direction of the conditioning air discharged from a vent nozzle. The air flow direction setting unit is operable between a concentrated discharge air mode in which the air flow discharged from the vent nozzle is concentrated on the occupants of the front seats, and a diffused discharge air mode in which it is directed toward the sides of the vehicular cabin. As the difference between the set cabin temperature and the cabin temperature decreases, the voltage applied to a blower motor toward a predetermined minimum value, and thereafter fluctuates regularly or irregularly. The mode of the air flow direction setting unit is changed from the diffused discharge air mode to the concentrated discharge air mode, a predetermined time before the voltage applied to the blower motor increases beyond a predetermined set value, and it is changed from the concentrated discharge mode to the diffused discharge air mode, when or a predetermined time before the voltage applied to the blower motor falls below the predetermined set value.

10 Claims, 5 Drawing Sheets

AIR CONDITIONER SYSTEM FOR AUTOMOTIVE VEHICLE

BACKGROUND OF THE INVENTION

1. Field of the Invention

The present invention relates generally to an air conditioner system for an automotive vehicle. More specifically, the invention relates to an air conditioner system which can automatically adjust blower speed to control air flow rate. Further particularly, the invention relates to an air conditioner system which allows the voltage applied to a blower motor to fluctuate after difference between the cabin temperature and the set cabin temperature become less than a predetermined value.

2. Description of the Prior Art

Various automotive air conditioner systems, which automatically adjust discharge air temperature and air flow rate to achieve comfortable conditions in a vehicular cabin, have been proposed. The Japanese Patent First (unexamined) Publication (Tokkai Sho.) No. 57-140216 discloses such an automatic air conditioner system. In the disclosed system, the voltage applied to a blower motor is controlled on the basis of temperature in the vehicular cabin. The voltage is decreased gradually as the cabin temperature approaches to the set cabin temperature. Thereafter, when difference between the cabin temperature and the set cabin temperature is less than 2° C., the voltage applied to the blower motor fluctuates periodically so that the rate of the conditioning air supplied to the vehicular cabin increases and decreases periodically. By this operation, the occupants of the vehicle feel a comfortably fluctuating breeze.

However, noise is produced by fluctuations of air flow rate and of rotating speed of the blower motor in such a conventional system. Therefore, although the occupants can feel a comfortably fluctuating breeze, they hear the distracting noise.

SUMMARY OF THE INVENTION

It is therefore a principal object of the present invention to eliminate the aforementioned disadvantage and to provide an air conditioner system which allows the occupants to feel a comfortably fluctuating breeze while reducing the distracting noise.

In order to accomplish the aforementioned and other specific objects, an air conditioner system, according to the present invention, includes means for causing the direction of conditioning air discharged from an outlet to be changed from a first direction in which the conditioning air is diffused so as not to concentyrated on the occupants of the vehicular cabin, to a second direction in which the conditioning air is concentrated on the occupants of the vehicular cabin, a predetermined time before the discharged amount increases beyond a predetermined set value.

According to one aspect of the present invention, an air conditioner system for an automotive vehicle comprises:

conditioning air passage means defining a conditioning air path and including an air outlet which opens into a vehicular cabin for discharging conditioning air into the vehicular cabin;

conditioning air generating means for adjusting temperature of the conditioning air to be discharged into the vehicular cabin;

temperature setting means for allowing manual setting of a desired temperature of the conditioning air in the vehicular cabin to produce a first signal indicative of the set temperature;

sensor means for monitoring temperature in the vehicular cabin to produce a second signal indicative of the vehicular cabin temperature;

first control means for adjusting discharge amount of the conditioning air into the vehicular cabin depending upon the difference between the first and second signal values, the first control means reducing the discharge amount toward a predetermined minimum value, and causing the discharge amount to fluctuate so as to increase and decrease after the difference between the first and second signal values becomes less than a predetermined value; and second control means for controlling direction of the conditioning air discharged from the air outlet between a first direction in which the conditioning air discharged from the air outlet is concentrated on the occupants of the vehicular cabin, and a second direction in which the conditioning air is diffused so as not to be concentrated on the occupants of the vehiclar cabin, the second control means causing the conditioning air to be directed in the first direction, a predetermined time before the discharge amount increases beyond a predetermined set value.

The second control means may cause the conditioning air to be directed in the second direction, a predetermined time before the discharge amount falls below the predetermined set value. Alternatively, the second control means may cause the conditioning air to be directed in the second direction when the discharge amount falls below the predetermined set value. The first control means may include a blower driven by means of a blower motor, and adjust voltage applied to the blower motor depending upon the difference between the first and second signal values. The voltage applied to the blower motor may decrease toward a predetermined minimum value, and fluctuate periodically after the difference between the signal values becomes less than the predetermined value, and the second control means may cause the conditioning air to be directed in the first direction, a predetermined time before the voltage applied to the blower motor increases to exceed a predetermined set voltage. In this case, the second control means may cause the conditioning air to be directed in the second direction, a predetermined time before the voltage applied to the blower motor falls below the predetermined set voltage. Alternatively, the second control means may cause the conditioning air to be directed in the second direction when the voltage applied to the blower motor falls below the predetermined set voltage. The volatge applied to the blower motor may decrease toward a predetermined minum value, and fluctuate so as to increase and decrease irregularly after the difference between the signal value becomes less than the predetermined value. The air outlet is preferably a vent nozzle. The difference between the first and second signal values is preferably 2°.

DESCRIPTION OF THE PREFERRED EMBODIMENT

Figure 1:
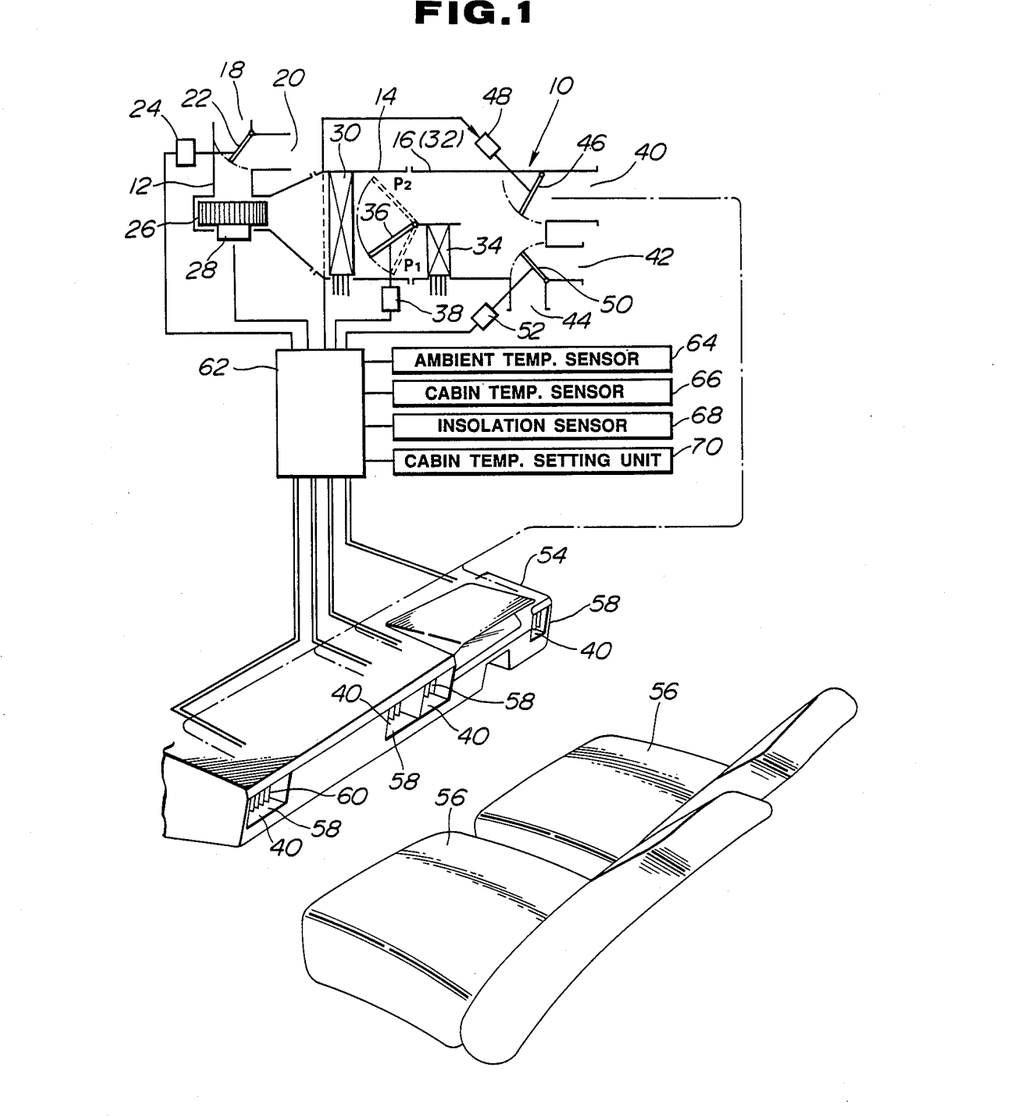
FIG. 1 is a schematic diagram of an air conditioner system according to the present invention.

Referring now to the drawings, particularly to FIG. 1, the preferred embodiment of an air conditioner system for an automotive vehicle, according to the present invention, includes a conditioning air duct assembly 10 which comprises a blower housing 12, a cooler unit housing 14 and an air mixing unit housing 16.

The blower housing 12 defines air inlets 18 and 20. The air inlet 18 draws air from the outside of the vehicle body, and thus will be referred to as "fresh air inlet". On the other hand, the air inlet 20 draws air from the vehicular cabin, and thus will be referred to as "recirculation air inlet". The fresh air inlet 18 and the recirculation air inlet 20 are selectively open and closed by means of an air intake door 22. The air intake door 22 is hinged on the wall of the blower housing 12 to be operated between a recirculation air mode position, in which the fresh air inlet 18 is closed and the recirculation air inlet 20 is fully opened, and a fresh air mode position, in which the recirculation air inlet 20 is closed and the fresh air inlet 18 is fully opened. Therefore, when the air intake door 22 is disposed at the fresh air mode position, only the fresh air is introduced into the blower housing 12, and when it is disposed at the recirculation air mode position, only the air from the vehicular cabin is introduced thereto. Moreover, when the air intake door 22 is disposed at an intermediate position between the fresh and recirculation air mode positions, both the fresh air and the air from the vehicular cabin are introduced into the blower housing 12. The air intake door 22 is driven by an intake door actuator motor 24.

The blower housing 12 also defines a space for receiving a blower 26. The blower 26 is disposed at a location beneath the fresh air inlet 18, and is driven by means of a blower motor 28. The air introduced through the fresh air inlet 18 or the recirculation air inlet 20, is blown against an evaporator 30, which is housed within the cooler unit housing 14, by means of the blower 26. The air flow is cooled by the evaporator 30 in a well known manner, and is thereafter introduced into a conditioning air passage defined in the air mixing unit housing 16. The air introduced into the conditioning air passage 32 is blown against a heater core 32 housed in the air mixing unit housing 16. The proportion of air flow passing through the heater core 34 to that bypassing the latter is determined by an air-mix door 36 which is provided within the conditioning air passage 32. The air-mix door 36 is hinged on the wall of the heater core 34 to be operated between positions P1 and P2. When the air-mix door is disposed at the position P1 the air cooled by the evaporator 30 does not pass through the heater core 34, so that the temperature of the air passing through the conditioning air passage 32 is not increased. On the other hand, when the air-mix door 36 is disposed at the position P2, the air cooled by the evaporator 30 passes through the heater core 34, so that the temperature thereof is increased. Therefore, in accordance with opening angle of the air-mix door 36, the amount of the air passing through the heater core 34 can be changed for adjusting the temperature of the air passing through the conditioning air passage 32. The air-mix door 36 is driven by means of an air-mix door actuator motor 38.

The conditioning air passage 32 defines a vent nozzle 40, a defroster nozzle 42 and a foot nozzle 44. The vent nozzle 40 is selectively opened and closed by means of a vent door 46 which is hinged on the inner wall of the conditioning air passage 32. The vent door 46 is driven by means of a vent door actuator motor 48. The defroster nozzle 42 and the foot nozzle 44 are selectively opened and closed by means of a defroster/foot selecting door 50. The defroster/foot selecting door 50 is hinged on the inner wall of the conditioning air passage 32 to be operated between a defroster mode position, in which the foot nozzle 44 is closed and the defroster nozzle 42 is fully opened, and a foot mode position, in which the defroster nozzle 42 is closed and the foot nozzle is fully opened. The defroster/foot selecting door 50 is driven by means of a selecting door actuator motor 52.

the vent nozzle 40 is divided into a plurality of nozzles which are formed in an instrument panel 54 arranged in front of front seats 56. A well known air flow direction setting unit 58 is provided on the end of each of the vent nozzles 34. The air flow direction setting unit 58 has a plurality of louvers 60 which are pivotably supported on the instrument panel 54 so that the direction of the air flow discharged from the vent nozzle 34 is changed horizontally. By changing the angle of the louvers 60, the air flow direction setting unit 58 is operable between a concentrated discharge air mode, in which the air flow discharged from the vent nozzle 34 is concentrated on the occupants of the front seats 56, and a diffused discharge air mode, in which it is directed toward the sides of the vehicular cabin.

The blower motor 28 and the actuator motors 24, 38, 48 and 52 are controlled by a control unit 62 which includes a microcomputer and produces a control signal on the basis of various input signals. The control unit is electrically connected to an ambient temperature sensor 64 for monitoring ambient temperature, a cabin temperature sensor 66 for monitoring temperazture in the vehicular cabin, and an insolation sensor 68 for monitoring the magnitude of insolation. The ambient temperature sensor 64 comprises a thermistor and produces a sensor signal indicative of the ambient temperature. The cabin temperature sensor 66 comprises a thermistor and produces a sensor signal indicative of temperature in the vehicular cabin. The insolation sensor 68 comprises a phototransistor and poroduces a sensor signal indicative of the in solution magnitude. These sensor signals are inputted to the control unit 62. The control unit 62 is also connected to a cabin temperature setting unit 70 which includes a manual operation switch assembly for manually setting a desired cabin temperature. The cabin temperature setting unit 70 selectively sets the desired cabin temperature and generates a signal indicative of the set cabin temperature. The signal produced by the cabin temperature setting unit 70 is also inputted to the control unit 62.

The operation of an air conditioner system, according to the present invention, is described below.

Figure 2:
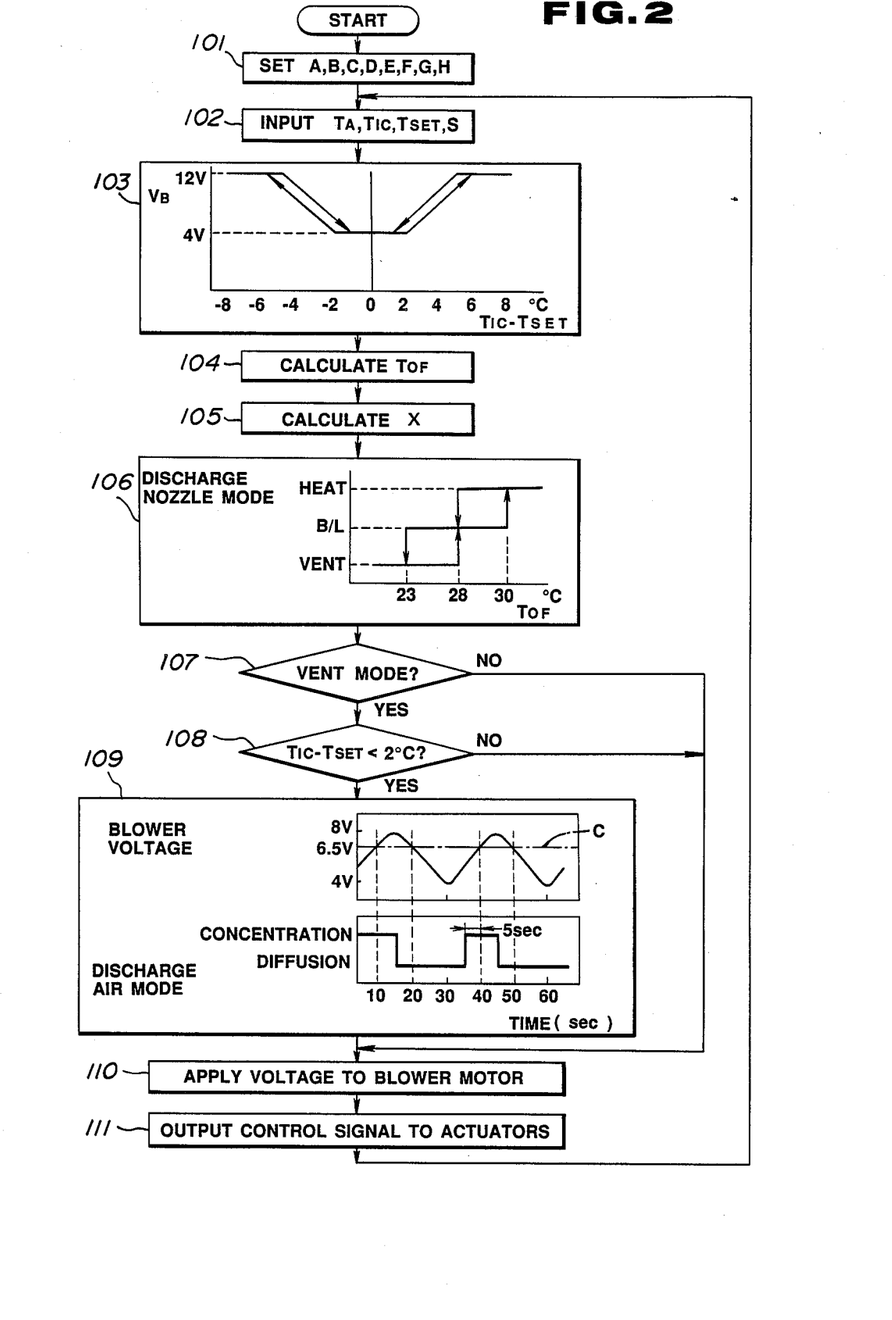
FIG. 2 is a flow chart illustrating a first preferred embodiment of control process in the air conditioner system to FIG. 1.

FIG. 2 illustrates a first preferred embodiment of a control process of the control unit 62 according to the present invention.

When a main switch not shown of the air conditioner system is turned on, the control unit 62 becomes active and the routine of FIG. 2 is executed. Immediately after starting execution of the routine of FIG. 2, constants A, B, C, D and E which are used for calculating the required discharge air temperature $T_{OF}$, and constants F, G and H which are used for calculating opening angle X of the air-mix door 36, are set at step 101.

At step 102, the sensor signals produced by the respective sensors are inputted to the control unit 62. That is, the sensor signals indicative of the ambient temperature $T_A$, the cabin temperature $T_{IC}$, the magnitude of insolation S, and the set cabin temperature $T_{SET}$ are inputted by the ambient temperature sensor 64, the cabin temperature sensor 66, the insolation sensor 68 and the cabin temperature setting unit 70, respectively. These sensor signals serve as ambient temperature data, cabin temperature data, insolation data and set cabin temperature data, respectively.

At step 103, difference between the cabin temperature $T_{IC}$ and the set cabin temperature $T_{SET}$ is calculated. On the basis of the difference $T_{IC}-T_{SET}$, the voltage $V_B$ which is applied to the blower motor 28 is determined. since rapid cooling or heating must be performed when the difference $T_{IC}-T_{SET}$ is great, the voltage $V_B$ is set to be relatively high. For example, when the absolute value of the difference $T_{IC}-T_{SET}$ is greater than about 5° C., the voltage $V_B$ is set at 12 volts. As the absolute value of the difference $T_{IC}-T_{SET}$ decreases, the voltage $V_B$ decreased gradually. For example, when the difference $T_{IC}-T_{SET}$ is less than about 2° C., the voltage $V_B$ is set at 4 volts.

At step 104, the required discharge air temperature $T_{OF}$ is calculated from the ambient temperature $T_A$, the cabin temperature $T_{IC}$, the set cabin temperature $T_{SET}$ and the insolation S in accordance with the following equation.

$$T_{OF}=A\times T_A+B\times T_{IC}+C\times T_{SET}+D\times S+E$$

in which A, B, C, D and E are constants.

On the basis of the required discharge air temperature $T_{OF}$ calculated at the step 104, at step 105, the opening angle X of the air-mix door 36 is calculated in accordance with the following the equation.

$$X=F\times T_{OF}^2+G\times T_{OF}+H$$

in which F, G and H are constants.

At step 106, the discharge nozzle mode is determined on the basis of the required discharge air temperature $T_{OF}$ calculated at step 104. At step 106, until the required discharge air temperature $T_{OF}$ decreases to 28° C., the operation mode is set to be HEAT mode in which both the defroster and foot nozzles 42 and 44 are opened. Thereafter, while the required discharge air temperature $T_{OF}$ further decreases to 23° C., the operation mode is set to be BI-LEVEL mode in which both the vent and foot nozzles 40 and 44 are opened. If the required discharge air temperature $T_{OF}$ further decreases to be less than 23° C., the operation mode is set to be VENT mode in which only the vent nozzle 40 is opened. On the other hand, until the required discharge air temperature $T_{OF}$ increases to 28° C., the operation mode is set to be the VENT mode. Thereafter, while the required discharge air temperature $T_{OF}$ further increases to 30° C., the operation mode is set to be the BI-LEVEL mode. If the required discharge air temperature $T_{OF}$ further increases to be greater than 30° C., the operation mode is set to be the HEAT mode.

Thereafter, the routine goes from step 106 to step 107 in which whether or not the set discharge nozzle mode is the VENT mode is determined. When the set discharge nozzle mode is not VENT mode, the routine goes to step 110 in which the voltage $V_B$ determined at step 103 is applied to the blower motor 28. Thereafter, the routine goes to step 111 in which control signals are outputted to the corresponding actuator motors 48 and 52 so that the HEAT or BI-LEVEL mode is set. On the other hand, when it is determined that the set discharge nozzle mode is VENT mode at step 107, the routine goes to step 108 in which whether or not the difference $T_{IC}-T_{SET}$ is less than 2° C. is determined. When the difference $T_{IC}-T_{SET}$ is not less than 2° C., the routine goes to step 110 in which the voltage $V_B$ determined at step 103 is applied to the blower motor 28. Thereafter, the routine goes to step 111 in which control signals are outputted to the corresponding actuator motors 48 and 52 so that the VENT mode is set. On the other hand, when it is determined that the difference $T_{IC}-T_{SET}$ is less than 2° C. at step 108, the routine goes to step 109.

At step 109, the voltage $V_B$ is so controlled as to change periodically. This control will be hereafter referred to as "pulsation air-flow control". At this step, the air flow direction setting unit 58 is also controlled between the concentrated discharge air mode and the diffused discharge air mode. This control will be hereafter referred to as "concentration/diffusion control". In the pulsation air-flow control, the voltage $V_B$ applied to the blower motor 28 is periodically changed between 4 volts corresponding to low air quantity L, and 8 volts corresponding to medium air quantity M, in relation to time. For example, the voltage $V_B$ is periodically changed so as to be a sine curve having 30 second period. The voltage $V_B$ may be changed in one of other suitable regular or irregular waves. Assuming that a border line C between the low air quantity L and the medium air quantity M is 6.5 volts of the voltage $V_B$, the periods of the low air quantity L and medium air quantity M coincident with the periods of the concentrated and diffused discharge air modes, respectively. Another voltage may be selected as the border line C in accordance with fluctuating voltage $V_B$. According to the present invention, the timing of the concentration/diffusion control is performed in relation to that of the pulsation air-flow control. The mode of the air flow direction setting unit 58 changes into the concentrated discharge air mode, a predetermined time, for example, 5 seconds before the voltage $V_B$ exceeds the border line C so that the medium air quantity M is achieved.

Although the occupants of the seats 56 can obtain comfortable ventilation when the mode of the air flow direction setting unit 58 is changed from the concentrated discharge air mode to the diffused discharge air mode, they may hear noise when the operation of the blower 26 is changed from the low air quantity L to the medium air quantity M. According to the present invention, since timing of the medium air quantity M is preceded by that of the concentrated discharge air mode by the predetermined number of seconds, the occupants feel the breeze, before they hear the wind noise of the blower 26.

With respect to such a plurality of stimuli successively received by a person, experimental results for human engineering are disclosed in "CHAIR PSYCHOLOGY, 3-SENSES", RYOJI SAKA, published by TOKYO UNIVERSITY PUBLISHING DEPARTMENT, pages 286 to 287. This report discloses that when a person receives two distinct stimuli, such as sound and light, successively, the sensitivity of the second stimulus is decreased by the preceding stimulus. Therefore, it can be demonstrated that when a person receives a plurality of stimuli, the preceding stimulus can decrease the person's sensitivity to the latter stimuli. Accordingly, it can be shown that the occupants become insensitive to the uncomfortable stimulus, i.e. noise produced by increase of rotating speed of the blower 26, since the increase in noise is preceded by the comforting breeze due to the operation of the air flow direction setting unit 58, by a predetermined number of seconds.

In order to demonstrate the aforementioned principle, an experiment was performed. In this experiment, noise in an air conditioner system according to the present invention was compared with that of a conventional system by five persons, who were asked to rate the harshness on a scale of 1 to 5 wherein the harshness is inversely proportional to the numerical value. This experiment was performed three times by each subject. The results are shown in the following table.

TABLE

|  | PERSON A | PERSON B | PERSON C | PERSON D | PERSON E |
|---|---|---|---|---|---|
| 1 | 4 | 3 | 4 | 5 | 3 |
| 2 | 3 | 4 | 4 | 4 | 4 |
| 3 | 4 | 5 | 4 | 5 | 3 |
| av. | 3.7 | 4 | 4 | 4.7 | 3.3 |

As shown in the table, the experiment demonstrates that the occupants become insensitive to the increase in noise of the blower 26 when it is preceded by the pleasant draft.

Figure 3:
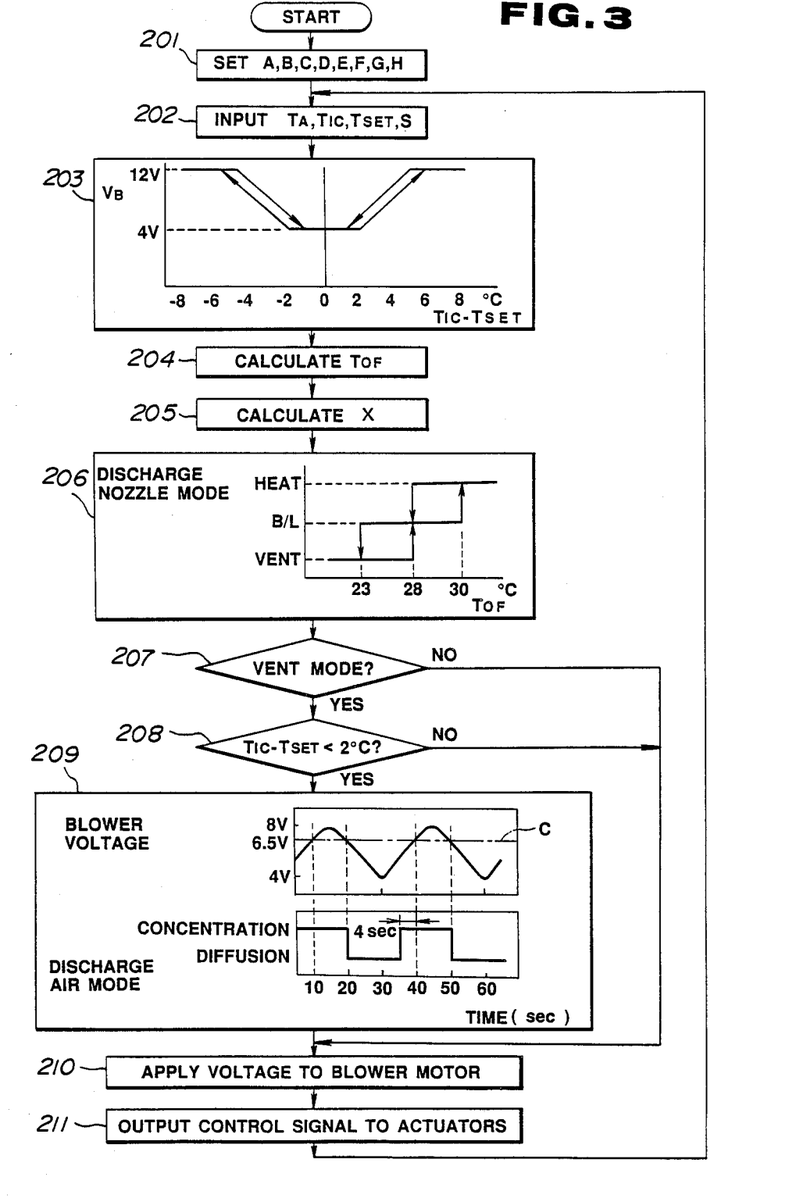
FIG. 3 is a flow chart illustrating a second preferred embodiment of control process in the air conditioner system of FIG. 1.

FIG. 3 illustrates a second preferred embodiment of control process of the control unit 62 according to the present invention. In this embodiment, step 209 is substituted for step 109 of FIG. 2. At step 209, the voltage $V_B$ is so controlled as to fluctuate periodically similar to step 109. At this step, concentration/diffusion control is also performed. The air flow direction setting unit 58 is changed to the concentrated discharge air mode, a predetermined time, for example, 4 seconds before the voltage $V_B$ exceeds the border line C so that the air quantity of the blower 26 becomes the medium air quantity M. On the other hand, the timing at which the air flow direction setting unit 58 is changed from the concentrated discharge air mode to the diffused discharge air mode, is synchronized with the timing at which the voltage $V_B$ falls below the border line C and the air quantity of the blower 26 becomes low air quantity M.

Figure 4:
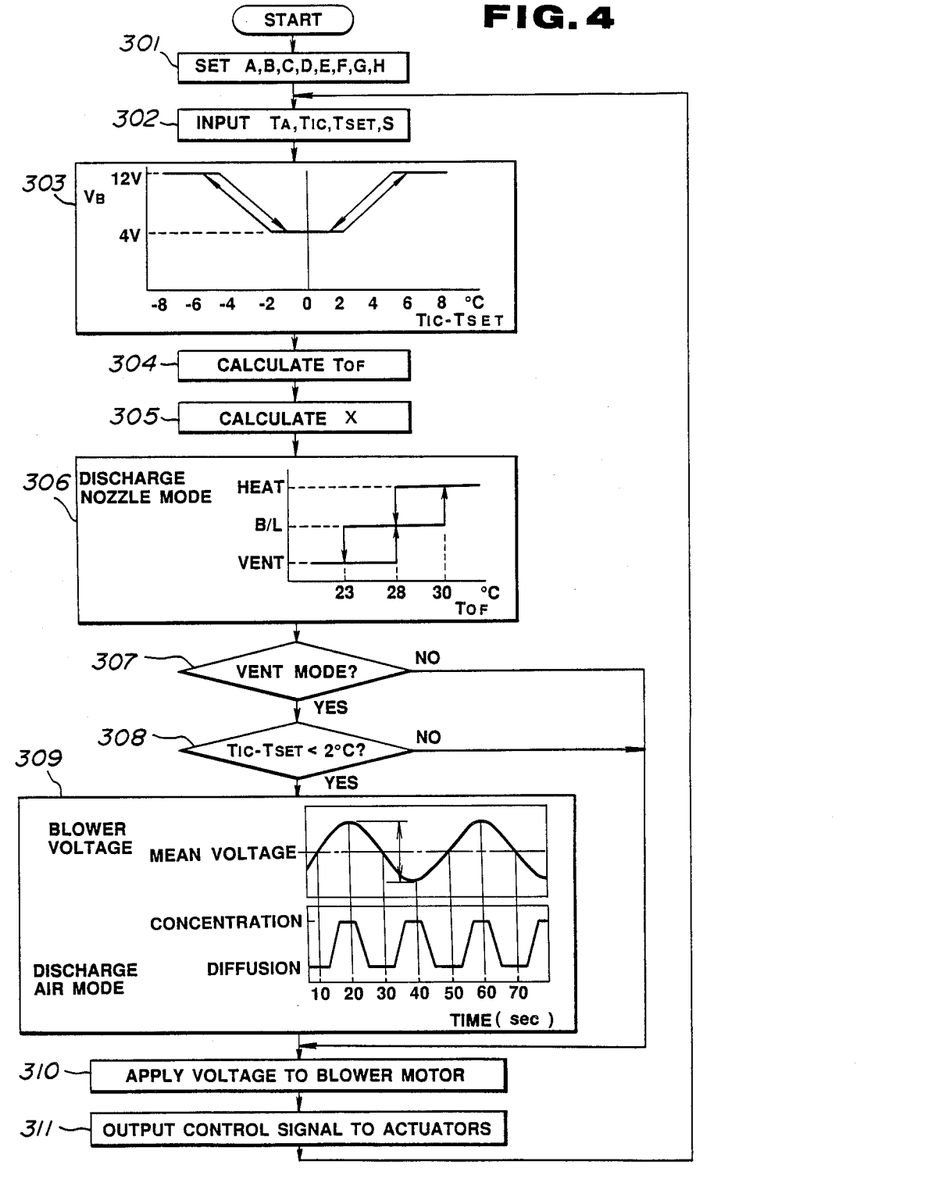
FIG. 4 is a flow chart illustrating a third preferred embodiment of control process in the air conditioner system of FIG. 1.

FIG. 4 illustrates a third preferred embodiment of control process of the control unit 62 according to the present invention. In this embodiment, step 309 is substituted for step 109 of FIG. 2. At step 309, the leading and trailing edges of the signal for controlling the discharge air mode of the air flow direction setting unit 58, are inclined, so that the discharge air mode is changed gradually. According to this embodiment, it is possible to prevent the density of the air flow discharged from the vent nozzle 40 from rapidly changing so as to prevent uncomfortable wind feeling due to rapid changing of the air flow.

Figure 5:
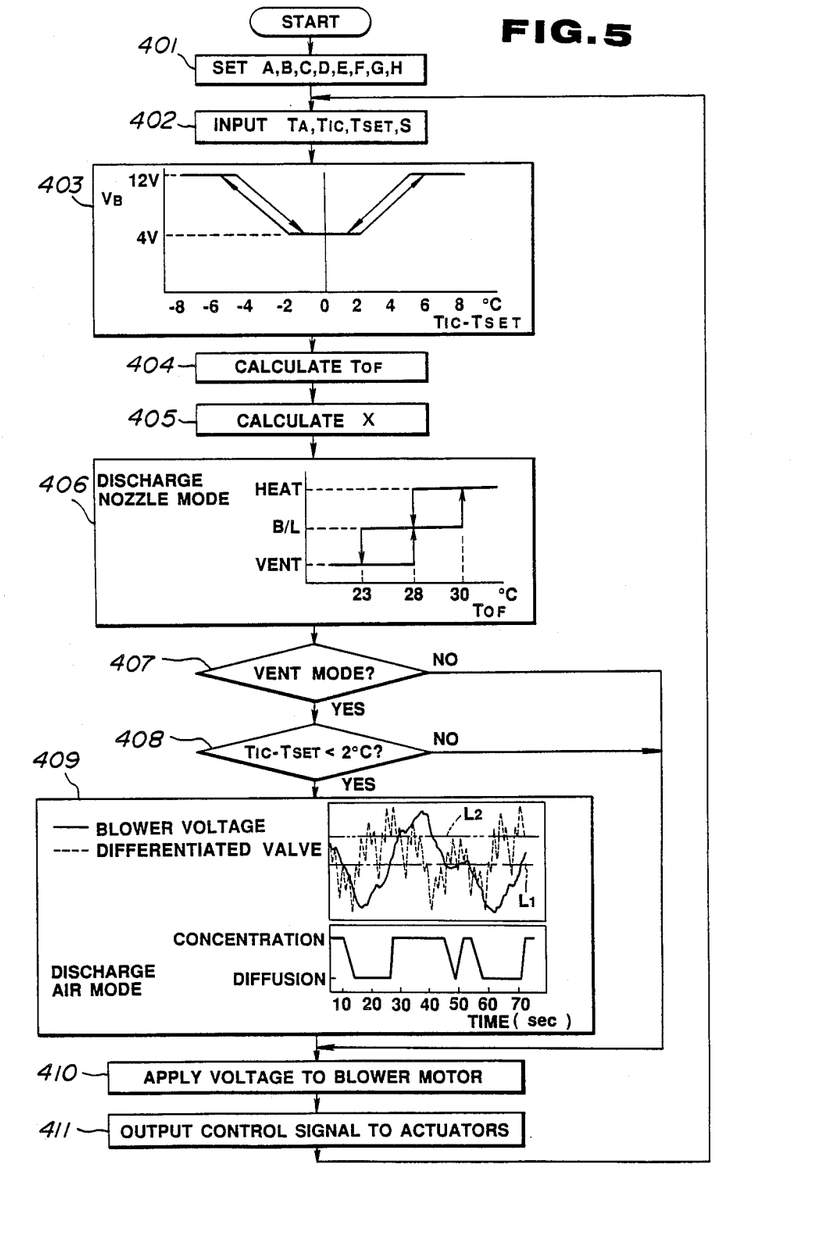
FIG. 5 is a flow chart illustrating a fourth preferred embodiment of control process in the air conditioner system of FIG. 1.

FIG. 5 illustrates a fourth preferred embodiment of control process of the control unit 62 according to the present invention. In this embodiment, step 409 is substituted for step 109 of FIG. 2. At step 409, the voltage $V_B$ applied to the blower motor 28 is differentiated with respect to time. The voltage $V_B$ is expressed by the continuous line, and the differentiated value $dV_B/dt$ is expressed by the dotted line. Then, it is determined whether or not the voltage $V_B$ and the differentiated value $dV_B/dt$ are greater than predetermined values $L_1$ and $L_2$, respectively, so that whether or not the blower voltage $V_B$ is to be rapidly increased is determined. When both the blower voltage $V_B$ and the differentiated value $dV_B dt$ are greater than the predetermined values $L_1$ and $L_2$, respectively, the air flow direction setting unit 58 is rapidly changed from the diffused discharge air mode to the concentrated discharge air mode. On the other hand, when the blower voltage $V_B$ is grater than the predetermined value $L_1$ while the differentiated value $dV_B/dt$ is less than the predetermined value $L_2$, the air flow direction setting unit 58 is gradually changed to the concentrated discharge air mode.

What is claimed is:

1. An air conditioner system for an automotive vehicle comprising:

conditioning air passage means defining a conditioning air path and including an air outlet which opens into a vehicular cabin for discharging conditioning air into said vehicular cabin;

conditioning air generating means for adjusting temperature of the conditioning air to be discharged into said vehicular cabin;

temperature setting means for desired temperature of the conditioning air in said vehicular cabin to produce a first signal indicative of the set temperature;

sensor means for monitoring the condition in said vehicular cabin to produce a second signal indicative of the vehicular cabin temperature;

first control means for adjusting discharge amount of said conditioning air into said vehicular cabin depending upon the relation between said first and second signal values, said first control means causing said discharge amount to fluctuate so as to increase and decrease after the difference between said first and second signal values becomes less than a prdetermined value; and second control means for controlling direction of the conditioning air discharged from said air outlet between a first direction in which the conditioning air discharged from said air outlet is concentrated on the occupants of the vehicular cabin, and a second direction in which the conditioning air is diffused into the vehicular cabin, said second control means causing said conditioning air to be directed in said first direction, a predetermined time before said discharge amount increases beyond a predetermined set value.

2. An air conditioner system as set forth in claim 1, wherein said second control means causes said conditioning air to be directed in said second direction, a predetermined time before said discharge amount falls below said predetermined set value.

3. An air conditioner system as set forth in claim 1, wherein said second control means causes said conditioning air to be directed in said second direction when said discharge amount falls below said predetermined set value.

4. An air conditioner system as set forth in claim 1, wherien said first control means includes a blower driven by means of a blower motor, and adjusts voltage applied to said blower motor depending upon the difference between said first and second signal values.

5. An air conditioner system as set forth in claim 4, wherein the voltage applied to said blower motor decreases toward a predetermined minimum value, and fluctuates periodically after the difference between said signal values becomes less than the predetermined value, and wherein said second control means causes said conditioning air to be directed in said first direction, a predetermined time before the voltage applied to said blower motor increases to exceed a predetermined set voltage.

6. An air conditioner system as set forth in claim 5, wherein said second control means causes said conditioning air to be directed in said second direction, a predetermined time before voltage applied to said blower motor falls below said predetermined set voltage.

7. An air conditioner system as set forth in claim 5, wherein said second control means causes said conditioning air to be directed in said second direction when the voltage applied to said blower motor falls below said predetermined set voltage.

8. An air conditioner system as set forth in claim 4, wherein the voltage applied to said blower motor decreases toward a predetermined minimum value, and fluctuates so as to increase and decrease irregularly after the difference between said signal values becomes less than the predetermined value.

9. An air conditioner system as set forth in claim 1, wherein said air outlet is a vent nozzle.

10. An air conditioner system as set forth in claim 1, the difference between said first and second signal values is 2° C.

* * * * *